Figure 1:
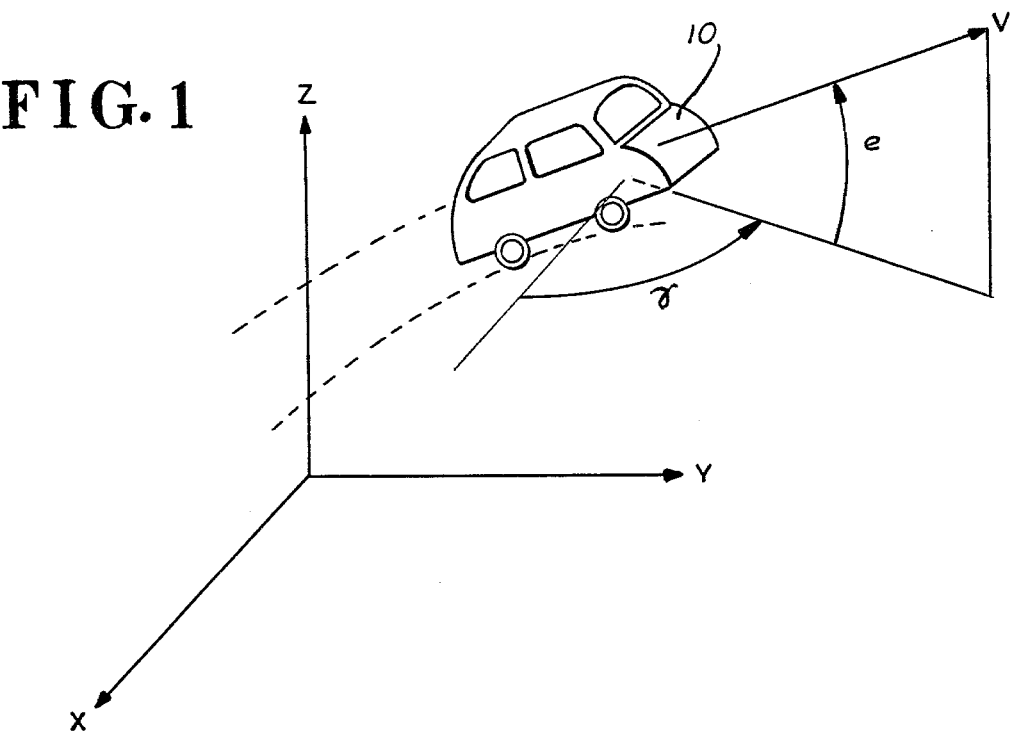

United States Patent [19]

Friedland

[11] 4,347,573
[45] Aug. 31, 1982

[54] LAND-VEHICLE NAVIGATION SYSTEM

[75] Inventor: Bernard Friedland, West Orange, N.J.

[73] Assignee: The Singer Company, Little Falls, N.J.

[21] Appl. No.: 956,459

[22] Filed: Oct. 30, 1978

[51] Int. Cl.³ .............................................. G06F 15/50
[52] U.S. Cl. ..................................... 364/453; 364/436
[58] Field of Search ............... 364/436, 443, 453, 432, 364/434, 450, 449, 424; 73/178 T; 340/27 NA

[56] References Cited

U.S. PATENT DOCUMENTS

| | | | |
|---|---|---|---|
| 3,249,914 | 5/1966 | Smart | 364/443 |
| 3,414,899 | 12/1968 | Buell | 364/453 |
| 3,694,631 | 9/1972 | Cushman | 364/434 |
| 3,749,335 | 7/1973 | Williams | 364/443 |
| 3,763,358 | 10/1973 | Cargille | 364/453 |
| 4,024,493 | 5/1977 | Ingels | 364/432 |
| 4,106,094 | 8/1978 | Land | 364/453 |
| 4,114,437 | 9/1978 | Krogmann | 364/453 |

*Primary Examiner*—Errol A. Krass
*Attorney, Agent, or Firm*—Laurence A. Wright; Thomas W. Kennedy

[57] ABSTRACT

The present invention operates on the principle that the velocity vector of a land-vehicle is along the longitudinal axis of the vehicle. The invention uses an odometer in conjunction with a set of three single axis rate gyros strapped down to the vehicle to provide a land vehicle navigation system. The single axis rate gyros are rigidly mounted to the body with input axes parallel to a set of reference axes in the vehicle. By means of these gyros it is possible to infer the heading of the vehicle and thereby achieve a navigation accuracy comparable to the accuracy that the same gyros would provide in a gimballed system, but without the necessity for the set of gimbals.

9 Claims, 2 Drawing Figures

LAND-VEHICLE NAVIGATION SYSTEM

PRIOR ART

| U.S. Pat. No. | Inventor | Date |
| --- | --- | --- |
| 3,694,631 | Cushman | 9/72 |
| 3,763,358 | Gargille | 10/73 |
| 4,024,493 | Ingels | 5/77 |
| 4,061,995 | McCrickerd | 12/77 |

This invention is related to land vehicle navigation systems. More particularly, this invention is related to a strapped down land vehicle navigation system employing an odometer for ascertaining the velocity vector.

BACKGROUND OF THE INVENTION

There are many applications that call for a land vehicle navigation system of moderate accuracy and cost. A number of systems have been described in which the basic navigation sensor is an odometer which provides a very accurate measurement of the total distance traveled, but no directional information. Various supplementary sensors to provide directional information have been studied, ranging from a simple magnetic compass to a costly inertial heading reference system. The simplest systems can meet the cost objectives but fail to meet performance objectives; the systems that use an inertial heading reference meet performance objectives but are usually too costly for widespread applications.

BRIEF DESCRIPTION OF THE INVENTION

The present invention describes a land vehicle navigation system comprising a set of strapdown gyros, one each for the three orthogonal X,Y and Z axes in addition to an odometer. The invention operates on the principle that the velocity vector lies along the longitudinal body axis in a land vehicle. This fact permits use of a single odometer (or speedometer) in place of three orthogonal accelerometers. Means such as multipliers, integrators and resolvers are provided to process the data from the sensors in order to provide the direction of the vehicle.

Accordingly, it is an object of this invention to provide a land vehicle navigation system employing an odometer and a set of strapdown gyros.

Figure 2:
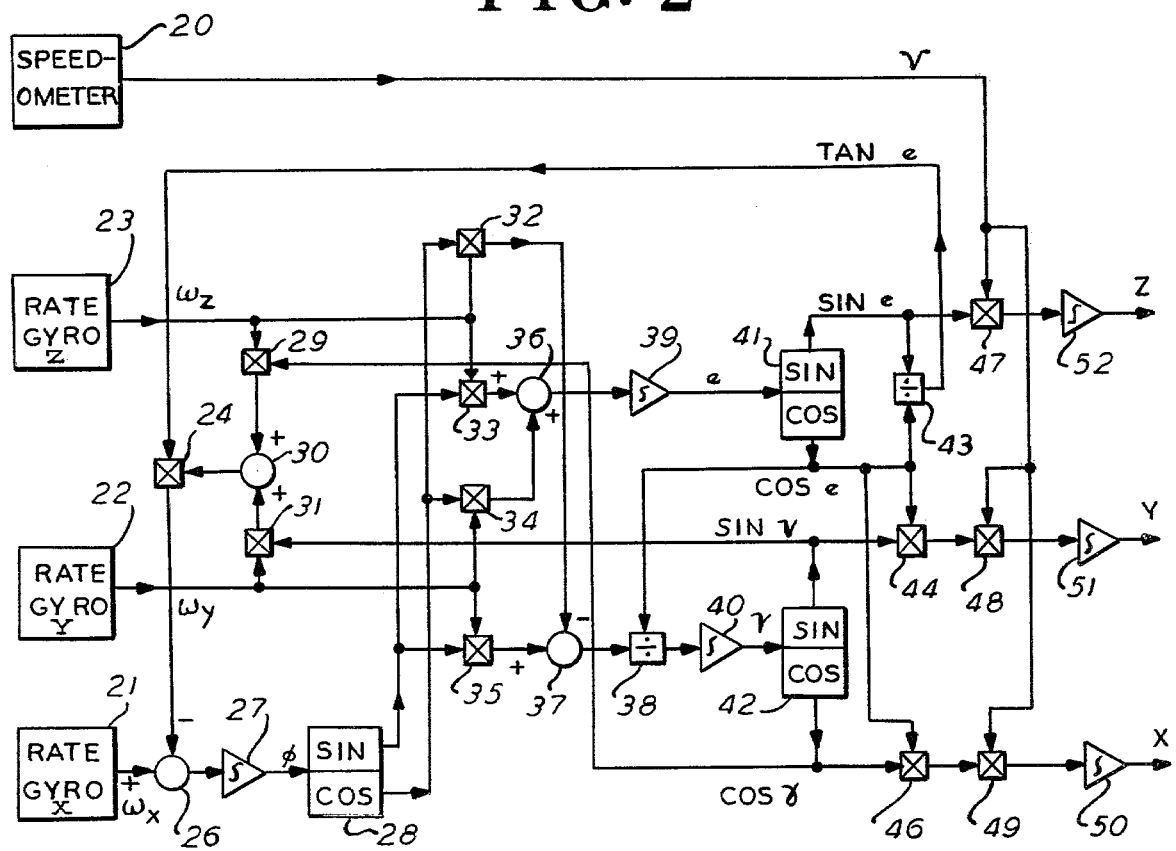

This and other objects, features and advantages of the present invention will become apparent from the following description taken in conjunction with the accompanying drawings wherein:

FIG. 1 shows the coordinates for the land vehicle navigation system of the present invention. However, for the sake of simplicity, the ground on which the vehicle moves is not shown; and FIG. 2 is a simplified functional block diagram of the land vehicle navigation system of the present invention.

Referring to FIG. 1, the coordinates X,Y and Z for the land-vehicle navigation system are shown. The vehicle 10 is shown moving in the direction of velocity vector V. Velocity vector V is coincident with the longitudinal axis of vehicle 10. The angle e is the elevation angle of the longitudinal axis of the vehicle from the horizontal and the angle $\gamma$ is the azimuth angle of the longitudinal axis of vehicle 10, relative to North.

The basic physical principle that the proposed system uses is that a land vehicle moves in the direction it is pointing. More accurately, in a land vehicle, the velocity vector tends to be aligned with the longitudinal body axis. The angle between the body axis and the velocity vector represents "side slip", which is present to a significant degree in a boat or an aircraft but is very small in a land vehicle (if the sensors are properly positioned in the vehicle). Thus, using the assumption of negligible side slip, the direction of the longitudinal axis of the vehicle, as sensed by a set of strapped down gyros (FIG. 2) provides the information needed to resolve the vehicle velocity as measured by the odometer into the proper spatial directions and thereby determine the position of the vehicle.

It is to be noted that for purposes of this invention, an odometer can be used interchangeably with a speedometer. The proper circuits can be provided to furnish the desired signal output.

Referring to FIG. 2, speedometer 20 provides a velocity signal to multipliers 47, 48 and 49. The strapped down angular rate gyros X, Y and Z designated by reference numerals 21, 22 and 23 respectively provides angular rate signals to multipliers, integrator and resolvers which result in vehicle direction output signals at the output integrators 50, 51 and 52 for the X, Y and Z axes respectively. More specifically, the X rate gyro provides a signal $\omega_x$ to summing network 26. This signal is combined with a signal representing $\tan \theta (\omega_x \cos \gamma + \omega_y \sin \gamma)$ in network 26 and applied to integrator 27 which provides a signal that is applied to resolver 28. Resolver 28 provides a sine angle signal to multiplier 35. The output of multiplier 35 is applied to network 37. Resolver 41 provides a cosine signal to divider 38 and thence to integrator 40 which provides azimuth angle $\gamma$ for input to resolver 42. From resolver 42 there is a consine $\gamma$ signal which is applied to multiplier 46. The signal from multiplier 46 is applied to multiplier 49 where it also is combined with the velocity signal from speedometer 20 and thence applied to integrator 50 to provide X direction.

Similarly, the diagram of FIG. 2 can be used to trace the signals from the Y and Z rate gyros to provide the Y and Z output direction signal.

This invention uses an odometer (or a speedometer) but does not use a direct heading reference. In lieu of a heading reference the system uses a set of single axis gyros 21, 22 and 23 which are strapped down to the vehicle body and have input axes parallel to a set of orthogonal reference axes in the vehicle. By means of these gyros it is possible to infer the heading of the vehicle and thereby achieve a navigation accuracy comparable to the accuracy that the same gyros would provide in a gimballed system, but without the necessity for the set of gimbals.

The basic principle that permits the omission of gimbals is that in a land vehicle, the longitudinal axis of the vehicle and the velocity vector of the vehicle are in very close alignment because the accelerations in the plane normal to the longitudinal axis of the vehicle are negligible.

With negligibly small accelerations in the plane normal to the longitudinal axis of the vehicle, the vehicle pitch angle $\theta$ and the elevation e of the velocity vector are nearly equal in magnitude. From the kinematic geometry shown in FIG. 1 it is clear that $$\dot{X} = V \cos e \cos \gamma \qquad (1)$$

-continued $$Y = V \cos e \sin \gamma$$

$$Z = V \sin \gamma$$

where V is the magnitude of the velocity vector. Moreover, from the well-known equations for the motion of a rigid body, the yaw, pitch, and roll rates are related to the angular rates $\omega_x, \omega_y$ and $\omega_z$ about the three body axes, by $$\dot{\psi} = \frac{\omega_z \cos \phi - \omega_y \sin \phi}{\cos \theta}$$

$$\dot{\theta} = \omega_z \sin \phi + \omega_y \cos \phi$$

$$\dot{\phi} = \omega_x - \tan \theta (\omega_z \cos \psi - \omega_y \sin \psi)$$

using the approximations $\theta \approx e$ and $-\psi > \gamma$ gives $$\dot{\gamma} \approx \frac{\omega_y \sin \phi - \omega_z \cos \phi}{\cos e} \quad (2)$$

$$\dot{e} \approx \omega_z \sin \phi + \omega_y \cos \phi$$

$$\dot{\phi} \approx \omega_x - \tan e (\omega_z \cos \gamma + \omega_y \sin \gamma)$$

Equations (1) and (2) constitute the basic navigation equations in which $\omega_x$, $\omega_y$ and $\omega_z$ are the measured body rates as obtained from the rate gyros, and V is the indicated speed obtained from the speedometer or by differentiating the output s(=total distance traveled) from an odometer. An analog implementation of the navigation equations (1) and (2) is shown in FIG. 2. A digital implementation of the same equations would be:

$$\begin{aligned}
x_{n+1} &= x_n + V_n \Delta t (\cos e_n \cos \gamma_n) \\
y_{n+1} &= y_n + V_n \Delta t (\cos e_n \sin \gamma_n) \\
z_{n+1} &= z_n + V_n \Delta t (\sin e_n) \\
\gamma_{n+1} &= \gamma_n + (\omega_y \Delta t \sin \phi_n - \omega_z \Delta t \cos \phi_n)/\cos e_n \\
e_{n+1} &= e_n + \omega_z \Delta t \cdot \sin \phi_n + \omega_y \Delta t \cdot \cos \phi_n \\
\phi_{n+1} &= \phi_n + \omega_x \Delta t - \tan e_n (\omega_z \Delta t \cos \gamma_n + \omega_y \Delta t \sin \gamma_n)
\end{aligned} \quad (3)$$

It is noted that $V_n \Delta t$ is the change in distance measured by the odometer in the interval $\Delta t$ and $\omega_x \Delta t$, $\omega_y \Delta t$, $\omega_z \Delta t$ are the incremental angles indicated by a set of rate integrating gyros. Thus, the calculations of (3) are independent of $\Delta t$, the interval between observations, provided only that $\Delta t$ is small enough to permit the approximation $du/dt > (u_{n+1} - u_n)/\Delta t$ where u denotes any of the variables appearing in (1) or (2).

Any technique that realizes the mathematical functions indicated by (1) and (2), or a reasonable approximation thereto would constitute an alternative method of construction. Many techniques are known including pure analog, pure digital, or hybrid. The functions of a digital computer can be accomplished in a general-purpose machine or in a machine that uses microprocessors to perform specific functions, such as computation of the sine and cosine of the azimuth and elevation angles as required by (1) and (2) or by (3).

For situations in which the random noise level is moderate to high, somewhat better performance can be achieved by using the Kalman filtering algorithm for data processing. In place of (1) and (2) the navigation equations would be:

$$\dot{x} = v \cos e \cos \gamma + k'_x r$$

$$\dot{y} = v \cos e \sin \gamma + k'_y r$$

$$\dot{z} = v \sin e + k'_z r$$

$$\dot{\gamma} = \frac{\omega_y \sin \phi - \omega_z \cos \phi}{\cos e} k'_\gamma r$$

$$\dot{e} = \omega_z \sin \phi + \omega_y \cos \phi + k'_e r$$

$$\dot{\phi} = \omega_x + \tan e(\omega_x \cos \gamma + \omega_y \sin \gamma) + k'_\phi r$$

with the auxiliary equations $$\dot{v} = k_v' r$$

$$\dot{s} = v + k_s' r$$

$$\dot{\omega}_x = k_{\dot{x}}' r$$

$$\dot{\omega}_y = k_{\dot{y}}' r$$

$$\dot{\omega}_z = k_{\dot{z}}' r$$

where (') denotes transposition, i.e. k'r is the dot product of k with r, and r is the residual vector defined by:

$$r = \begin{bmatrix} s_m \\ \omega_{xm} \\ \omega_{ym} \\ \omega_{zm} \end{bmatrix}$$

in which $s_m$, $\omega_{xm}$, $\omega_{ym}$, $\omega_{zm}$, are the measured distance traveled (from the odometer) and the angular velocity components about the body axes as indicated by the strapdown gyros. The vectors $k_x, \ldots, k_z$ are components of the Kalman filter "gain matrix" formulas for which are well-known in the state of the art.

While particular embodiments of the invention have been shown and described, modifications may be made, and it is intended in the following claims to cover the embodiments which fall within the true spirit and scope of the invention.

What is claimed is :

1. A land vehicle navigation system comprising:
  means for providing a signal indicative of the speed of the vehicle,
  means strapped down to said vehicle along three orthogonal axes for generating angular rate signals along said axes, and
  means for combining said signal indicative of the speed of said vehicle and said orthogonal rate signals for determining the position of said vehicle along said three axes.

2. The land vehicle navigation system of claim 1 wherein said means for providing a signal indicative of the speed of said vehicle comprises:
  a speedometer connected to said combining means.

3. The land vehicle navigation system of claim 2 wherein said strapped down means for generating angular rate signals comprises:
  an angular rate gyro along the X axis,
  an angular rate gyro along the Y axis, and
  an angular rate gyro along the Z axis.

4. A land vehicle navigation system comprising:
a speedometer for providing a velocity signal along the heading axis of the vehicle carrying said navigation system,
strapped down angular rate gyros mounted along the X, Y and Z axes of said vehicle for generating rate signals along said axes,
a first set of integrators individually connected to said rate gyros for generating elevation angle, heading angle and azimuth angle due to the acceleration normal to the longitudinal axis of said vehicle,
a plurality of resolvers individually connected to said first set of integrators for generating sine and cosine functions of said elevation and azimuth angles,
a separate set of multipliers individually connected to the output of each of said angular rate gyros, and
a second set of integrators individually connected to said multipliers of each angular rate gyro and said speedometer for generating signals indicative of vehicle direction along each of said axes.

5. A land vehicle navigation system comprising:
an odometer for providing a distance traveled signal along the heading axis of the vehicle carrying said navigation system,
strapped down angular rate gyros mounted along the X, Y and Z axes of said vehicle for generating rate signals along said axes,
a first set of integrators individually connected to said rate gyros for generating elevation angle, heading angle and azimuth angle due to the acceleration normal to the longitudinal axis of said vehicle,
a plurality of resolvers individually connected to said first set of integrators for generating sine and cosine functions of said elevation and azimuth angles,
a separate set of multipliers individually connected to the output of each of said angular rate gyros, and
a second set of integrators individually connected to said multipliers of each angular rate gyro and said odometer for generating signals indicative of vehicle direction along each of said axes.

6. A land vehicle navigation system comprising:
a speedometer for providing a signal indicative of the speed of the vehicle,
a plurality of angular rate gyros strapped down to said vehicle along three orthogonal X, Y and Z axes for generating rate signals along said axes, and
said speedometer connected to separate multipliers connected to the output of each angular rate gyro for combining said signals indicative of the speed of said vehicle and said orthogonal rate signals for determining the position of said vehicle along said three axes.

7. The land vehicle navigation system of claim 6 comprising:
a first set of integrators individually connected to said angular rate gyros for generating elevation angle, yaw angle and azimuth angle due to the acceleration normal to the longitudinal axis of said vehicle.

8. The land vehicle navigation system of claim 7 comprising:
a plurality of resolvers individually connected to said first set of integrators for generating sine and cosine functions of said elevation and azimuth angles.

9. The land vehicle navigation system of claim 8 comprising:
a second set of integrators individually connected to said multipliers of each angular rate gyro output for generating output position along each of said angular axes.

* * * * *